United States Patent Office 3,171,145
Patented Mar. 2, 1965

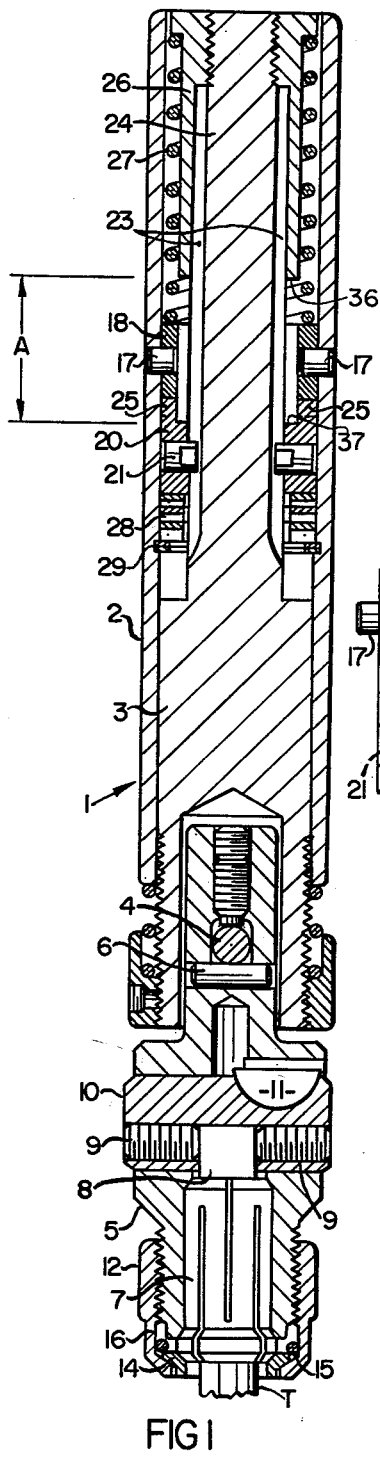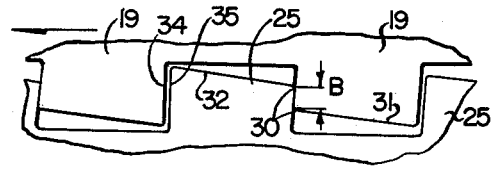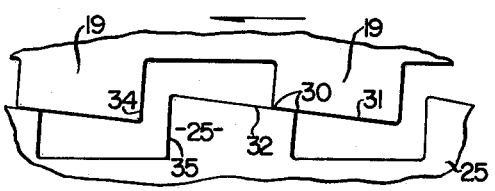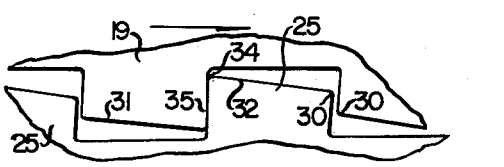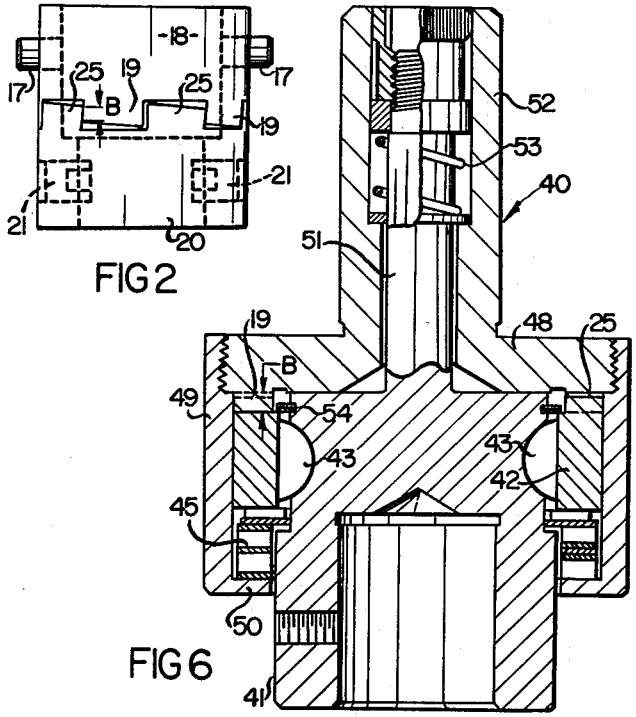

3,171,145
SELF-RELEASING TAP HOLDER
Milton L. Benjamin, Shaker Heights, and Franklyn E. Winnen, Cleveland, Ohio, assignors to Erickson Tool Company, Solon, Ohio, a corporation of Ohio
Filed Oct. 26, 1961, Ser. No. 147,984
5 Claims. (Cl. 10—129)

The present invention relates generally as indicated to a self-releasing tap holder of the type in which a tap or the like, held thereby is automatically released when it enters the workpiece to a prescribed and adjustable depth.

It is a principal object of this invention to provide such a self-releasing tap holder having a novel form of clutch which is operative to release the tap holder at precisely the proper time and which, within the space of one tooth of the clutch, is operative to positively unscrew the tap from the workpiece upon reversal of the relative rotation of the workpiece and the tap holder.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

In said annexed drawings:

FIG. 1 is a central longitudinal cross-section view showing one embodiment of the present invention;

FIG. 2 is an elevation view of the novel form of clutch employed in the self-releasing tap holder of FIG. 1;

FIGS. 3, 4, and 5 are enlarged fragmentary developed views showing the clutch teeth in various positions of engagement; and FIG. 6 is a cross-section view of another embodiment of this invention.

Referring now more particularly to the drawings, and first to FIGS. 1 to 5, the self-releasing tap holder herein comprises a floating tap holder assembly 1 in the tubular support or driver 2 of which the holder body 3 is mounted for axial movement. Pinned in the holder body 3 by pin 4 is a floating tap chuck 5 wherein the cross pins 4 and 6 fixed in the holder body 3 and in the chuck 5 respectively have point contact with each other to permit aligning movement of the chuck 5 in body 3 with respect to the axis of the bore of a workpiece which is to be threaded by a tap T held in the contractible collet 7. Also, the tang 8 of the tap T is held between the setscrews 9 of a floating cylindrical member 10 non-rotatably held in chuck body 5 by key 11 whereby any eccentricity in the tang 8 of the tap T with respect to the shank thereof which is gripped in the collet 7 will not result in misalignment of the tap T in the chuck 5.

The chuck 5 essentially comprises the collet 7 alternately slotted from its opposite ends and having parallel, axially spaced apart beveled faces as shown engaging complemental frusto-conical faces formed in the chuck body 5. A nosepiece 12 is threaded on the chuck body 5 and bears on a nose ring 14 which, in turn, bears on the axially outer end of the collet 7 to urge the latter axially inwardly for contraction into gripping engagement with the shank of the tap T. The nose ring 14 and nosepiece 12 are retained together against inadvertent separation as by means of a snap ring 15 which is fitted into an undercut 16 in the nosepiece 12.

Fixedly mounted in the tubular support member 2 as by means of the pins 17, is a first or driver clutch element 18 having teeth 19 of shape as best shown in FIGS. 3, 4, and 5. The second or driven clutch element 20 is axially slidably keyed by the keys 21 engaged in keyways 23 formed in the shank 24 of the holder 3, said second clutch element 20 being formed with teeth 25 interengageable with the teeth 19 of the first clutch element 18 as best shown in FIG. 3, when the tap T is first inserted into the bore of a workpiece which is to be threaded.

Fixed on the shank 24 is a clutch disengaging member 26 upon which the spring 27 bears to initially position the tap chuck 5 and holder 3 assembly in its FIG. 1 starting position. The other end of the spring 27 bears on the fixed first clutch element 18. The second clutch element 20 is yieldably urged toward the first clutch element 18 as by means of a series of wavy spring washers 28 disposed between said second clutch element 20 and snap rings 29 or the like which are axially fixed in an undercut formed in the tubular support member 2.

From the foregoing it can now be seen that when the tap T is inserted into a workpiece bore and when the workpiece and tap T are relatively rotated in a thread-cutting direction, as by rotation of the driver 2, the tap T, including the holder 5 and 3, will move axially downwardly as viewed in FIG. 1, a distance determined by the initial distance A plus the distance B of tooth engagement. It will be noted that the distance A is the distance between the bottom end 36 of the clutch disengaging member 26 and the inwardly extending shoulder 37 of the driven clutch element 20, whereby the latter is not physically contacted by such bottom end until the distance A has been traversed. When the distance A is zero, and the noted contact is established, continued entry of the tap T into the work will cause the second clutch element 20 to be moved away from the first clutch element 18, gradually decreasing distance B of tooth engagement. Finally, when the distance B is zero with the corners 30 of the teeth 19 and 25 in alignment, the tap T will be released so as no longer to cut threads in the workpiece, and as long as the workpiece and the support member 2 continue to rotate with respect to one another, the tap T and the workpiece will not relatively rotate because of the clicking of the teeth 25 of the second clutch element 20 over the teeth 19 of the first clutch element 18. The corners 30 of the teeth 19 and 25 will preferably be stoned to about a 0.010" radius.

By reason of the sloping crests 31 of the teeth 19 and the corresponding sloping crests 32 of the teeth 25, the teeth 19 of the driver element 18 will click over the teeth 25 of the driven element 20, but, as soon as the direction of relative rotation of the workpiece and support member or driver 3 is reversed, the sides 34 and 35 of the teeth 19 and 25 are axially overlapped as shown in FIG. 4, whereby unscrewing of the tap T from the workpiece will commence at least within a maximum rotation of one tooth pitch, and the wavy spring washers 28 will progressively cause full engagement of the clutch elements 18 and 20 along the sides 34 and 35 as shown in FIG. 5.

In FIG. 6 is shown another form of self-releasing tap holder 40 in accordance with the present invention wherein a tap is adapted to be clamped directly in the holder body 41 on which the movable driven clutch element 42 corresponding to the second clutch element 20 in FIG. 2 is axially slidably keyed on the keys 43 of the holder and again wavy spring washers 45 or the like are employed to yieldably urge the driven clutch element 42 to a position with its teeth 25 engaged with the teeth 19 formed integrally on the support or driver member 48. The support member 48 has screwed thereon to a nut 49 which provides an inturned flange 50 against which the wavy spring washers 45 bear. The shank 51 of the holder 41 fits in the hollow shank 52 of the support member 48 and a coil spring 53 is employed to hold the teeth 19 and 25 of the clutch elements 42 and 48 in engagement. In FIG. 6 the distance corresponding to A in FIG. 1 is taken care of by the feed of the machine, whereas, the distance B is the additional distance that the tap travels into the workpiece just prior to releasing of the tap. Accordingly, when the tap and tap holder have moved the distance A, as determined by the machine tool slide itself, continued movement will, through the snap rings 54 that bear on the clutch element 42, result in progressive reduction of the distance B to zero, whereafter the clutch elements 42 and 48 are disengaged for clicking of the teeth 19 and 25 over one another as depicted in FIG. 4. Here again, as in FIGS. 1 to 5, the driven clutch element teeth 25 will reengage teeth 19 within a maximum rotation of one pitch of the teeth as soon as the direction of rotation of the driver 48 with respect to the work is reversed whereby the tap in holder 41 is unscrewed from the work.

In the examples herein given the clutch elements are formed with five equally spaced teeth 19 and 25 whereby unscrewing of the tap T commences within 0 to 72° reversed rotation of the driver element. The crests 31 and 32 of the teeth slope at an angle of 7° and the sides in tap driving engagement have a back slope of 5° to preclude premature disengagement until the stoned corners 30 are aligned. The other sides 34 and 35 are preferably in radial planes and are of 0.125" depth.

Other modes of applying the principle of the invention may be employed, change being made as regards the details described, provided the features stated in any of the following claims, or the equivalent of such, be employed.

We therefore particularly point out and distinctly claim as our invention:

1. A self-releasing tap holder comprising a tap driver having a driver clutch element with circumferentially spaced teeth; a tap holder within said driver having a driven clutch element with corresponding teeth engaged in the interdental spaces of said driver clutch element; spring means yieldably holding said clutch elements in interengagement; and a clutch disengaging means on said holder operative to directly contact said driven clutch element and disengage said teeth upon predetermined relative axial travel of said driver and holder.

2. The self-releasing tap holder of claim 1 wherein said clutch disengaging means radially overlaps a portion of said driven clutch element to effect such disengagement upon predetermined axial travel of said holder with respect to said driver.

3. A self-releasing tap holder comprising a tap driver having a driver clutch element with circumferentially spaced teeth, said driver clutch element being fixed with respect to said driver; a tap holder having a driven clutch element with corresponding teeth engaged in the interdental spaces of said driver clutch element, said tap holder being axially slidably keyed in said driven clutch element; spring means yieldably holding said clutch elements in interengagement; said driven clutch element being axially movably supported in said driver against said spring means; and a clutch disengaging member on said holder body operative to disengage said teeth upon predetermined relative axial travel of said driver and tap holder.

4. A self-releasing tap holder comprising a tap driver having a driver clutch element with circumferentially spaced teeth; a tap holder having a driven clutch element with corresponding teeth engaged in the interdental spaces of said driver clutch element; spring means yieldably holding said clutch elements in interengagement; and a clutch disengaging member on said holder operative to disengage said teeth upon predetermined relative axial travel of said driver and holder; said teeth on both said driver and driven clutch elements being axially overlapped when interengaged and having substantially axially extending sides in tap driving engagement with back-slope, whereby the leading corners of the teeth of said driver clutch element are circumferentially ahead of the trailing corners of the teeth of said driven clutch element to preclude disengagement until said corners are in alignment.

5. The self-releasing tap holder of claim 3 wherein said teeth are arranged in annular rows with pairs of axially overlapping sides of which one side of each pair are overlapped when said clutch elements are in driving engagement and of which the other side of each pair are overlapped when said driver is reversed following disengagement of said clutch elements, and with sloping crests for clicking of said teeth over one another when said driver continues to rotate in driving direction following disengagement of said clutch elements.

References Cited by the Examiner
UNITED STATES PATENTS

| | | | |
|---|---|---|---|
| 915,568 | 3/09 | Douglas | 10—135 |
| 2,733,795 | 2/56 | Christie | 192—67 |
| 2,868,030 | 1/59 | Forwald | 192—143 |
| 2,923,951 | 2/60 | Beavis | 10—105 |

FOREIGN PATENTS 436,232  11/26  Germany.

ANDREW R. JUHASZ, *Primary Examiner.*
WILLIAM W. DYER, Jr., THOMAS J. HICKEY,
*Examiners.*